United States Patent Office 3,348,258
Patented Oct. 24, 1967

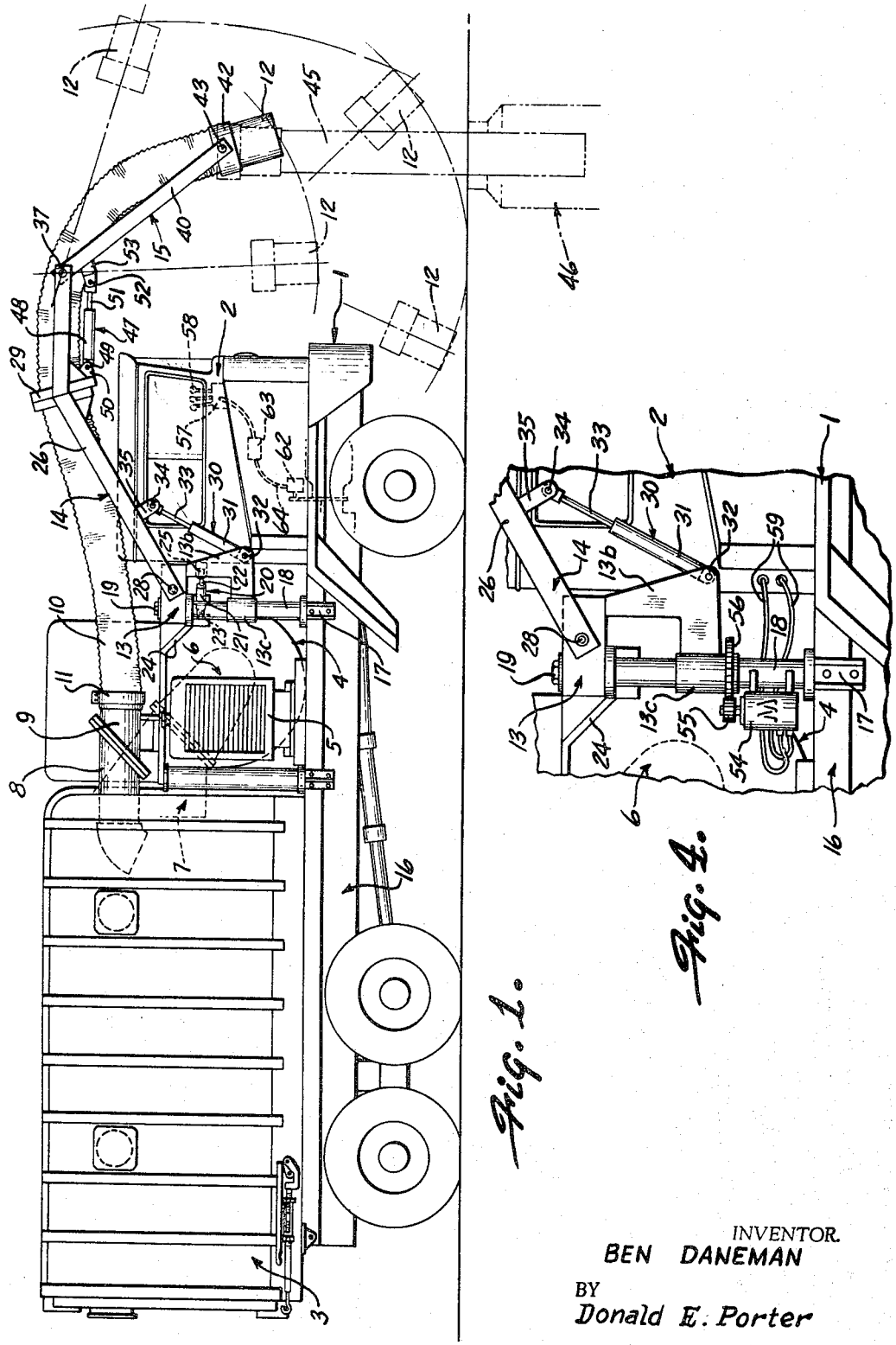
Oct. 24, 1967          B. DANEMAN          3,348,258
VACUUM-TYPE DEBRIS COLLECTOR
Filed June 18, 1965                    2 Sheets-Sheet 1
INVENTOR.
BEN DANEMAN
BY Donald E. Porter
ATTORNEY

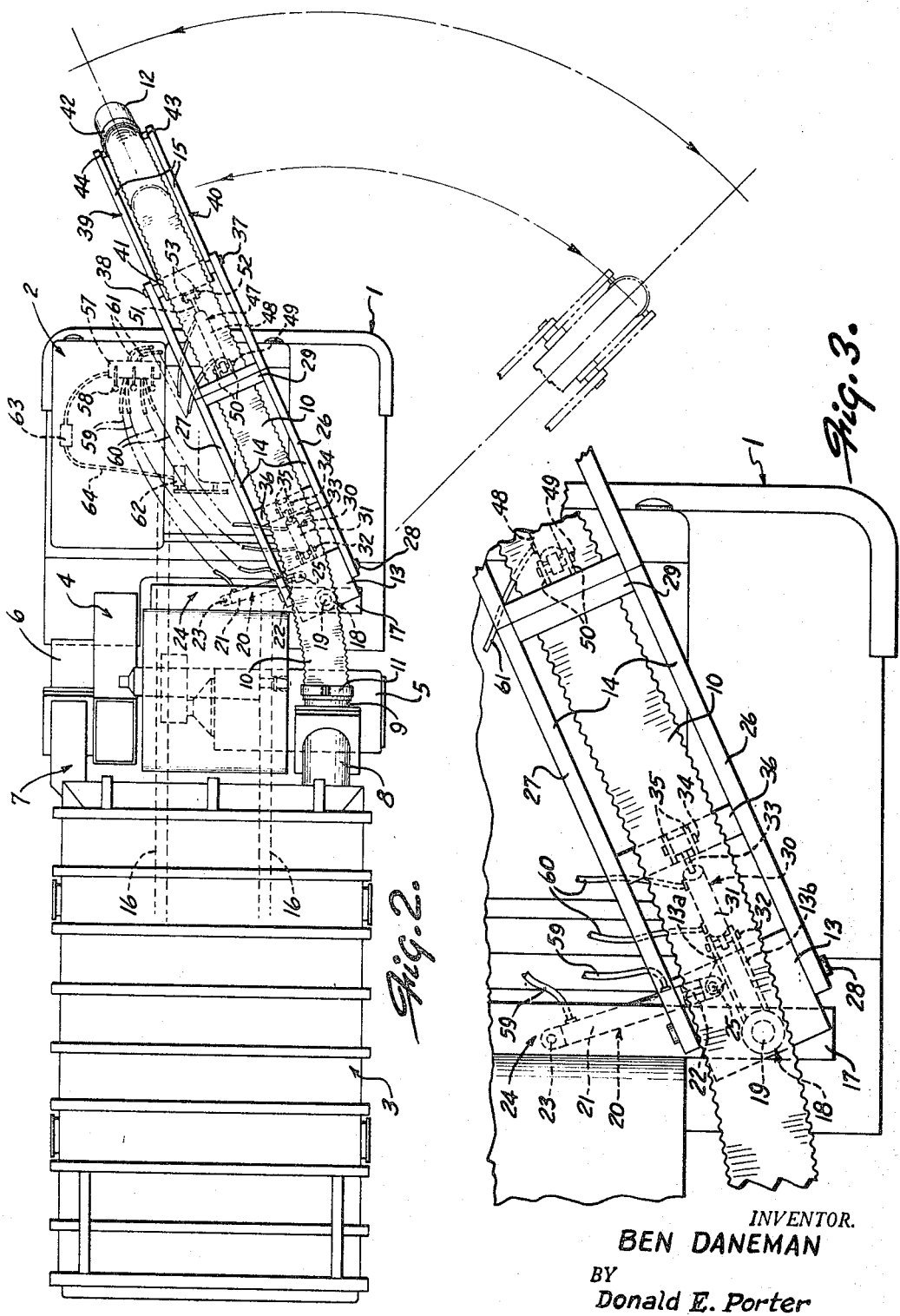

3,348,258
VACUUM-TYPE DEBRIS COLLECTOR
Ben Daneman, Milwaukee, Wis., assignor to Central Engineering Company, Inc., Milwaukee, Wis., a corporation of Wisconsin
Filed June 18, 1965, Ser. No. 464,976
20 Claims. (Cl. 15—314)

ABSTRACT OF THE DISCLOSURE

A vacuum debris collector for a vehicle-mounted vacuum tank having a forward intake opening, including a flexible nozzle in substantially airtight communication with the opening, and a rotatable power boom assembly connected to the nozzle and having controls located remote therefrom whereby the operator may observe and controllably rotate the power boom assembly and direct the nozzle's suction end to debris in front of or to the side of the vehicle and retract the power boom assembly and nozzle to a position below the overall height of the vehicle so that the driver may have an unobstructed view of the road ahead and the vehicle may pass under highway underpasses, trees and the like.

---

This invention relates to a mobile apparatus for picking up and removing trash and litter from highways, streets and the like, and which employs a flexible vacuum nozzle.

The use of a flexible vacuum nozzle to remove debris from the gutters and catch basins of streets is known in the art. One type of apparatus, which is shown in Patent No. 3,052,908, issued Sept. 11, 1962, to the inventor, has a nozzle which selectively can be connected to openings in the sides or rear of an enclosed vacuum tank mounted on a truck chassis. In such apparatus, the nozzle is manipulated back and forth across the edge of the street or gutter or in the catch basin by a man standing on the street alongside or behind the tank, who manually directs the intake or suction end of the nozzle to the debris to be sucked into the tank. Speedy and efficient debris collection by the use of such apparatus requires that the crew of such a truck be comprised of two men: The driver, and the nozzle operator. In such an arrangement, the driver of the truck cannot readily see the nozzle operator at the side or rear of the truck (thereby exposing the nozzle operator to danger while the truck is being backed or turned), or determine whether the speed and direction at which he is driving the truck is commensurate with the amount and location of the debris. If the crew is comprised only of the driver, he periodically must stop the truck in order to proceed to the rear or side of the truck and direct the nozzle to the debris which the suction end of the nozzle can reach. In either case, the operator of the nozzle, whether he is the driver or a second man, must leave the cab of the truck and expose himself to weather while he operates the nozzle.

Another type of apparatus, which is shown in Patent No. 2,663,894, issued Dec. 29, 1953, is a self-contained unit comprising a blower engine, a blower and a nozzle, all mounted on an independent chassis frame horizontally hinged at the front end of a truck. Such apparatus can be operated by the truck driver while the truck is in motion. However, such apparatus is capable only of collecting leaves and litter prearranged in low windrows on streets and in gutters and cannot be used to collect substantial piles of litter or to clean catch basins, because the suction end of the nozzle is held in fixed vertical relationship to the street surface when in operating position by the weight of the blower and the blower engine on the independent frame. In addition, the suction end of the nozzle is not vertically hinged or powered to be swung to the side of the truck to collect debris located on parkways and sidewalks. Finally, when the independent frame is raised from its operating position for highway travel, the driver's vision to the front and side of the truck is obstructed by the blower, the blower engine and the blower duct.

The present invention provides an improved debris collecting apparatus for a vehicle having a rearwardly tippable vacuum tank mounted thereon with an intake opening in the front of such tank and a debris dumping opening in the rear of such tank. According to such invention, a flexible nozzle is placed in substantially airtight communication with such opening and has a second suction end. A rotatable power boom assembly, mounted on the vehicle adjacent to the tank and having a system of controls for such power boom assembly located remote from such power boom assembly and adjacent an operator's station adjacent the front of the vehicle, enables the operator, while seated at his station and while the vehicle is in motion, to control the means for rotating the power boom assembly to rotate the power boom assembly forward and to the side of the vehicle. The operator thereby effortlessly, precisely and rapidly can direct the suction end of the nozzle, which is connected to the power boom assembly and within the vision of the operator, to the debris to be collected, whether the debris is located in front of or to the side of the vehicle, without having to disconnect and reconnect the nozzle to other openings on the side or rear of the tank in order to extend the debris-collecting range of the nozzle. When the debris has been collected, the power boom assembly and the nozzle may be retracted to a position relative to the driver's position in the cab such that the driver then has an unobstructed view of the road ahead while driving the vehicle at highway speeds, and to a position relative to the top of the vehicle in which the power boom assembly and nozzle will not substantially add to the overall height of the vehicle (as defined by the top of the uppermost equipment mounted on the vehicle) so that the overall height of the vehicle, including the power boom assembly, will not exceed the height limitations of highway underpasses and the like.

The best mode presently contemplated of carrying out the invention is illustrated in the accompanying drawings, in which FIGURE 1 is a side elevational view of a cleaning apparatus embodying the present invention, as utilized for cleaning a catch basin.

FIGURE 2 is a plan view of the cleaning apparatus shown in FIGURE 1, as utilized for removing trash and litter from streets and gutters.

FIGURE 3 is a fragmentary, plan view, on an enlarged scale, of the center-pin and turntable shown in FIGURE 1.

FIGURE 4 is a fragmentary, side elevational view, on an enlarged scale, of the center-pin and turntable shown in FIGURE 1, utilizing a hydraulic motor as the means for rotating such turntable.

The debris-collecting apparatus is mounted on a self-propelled truck or like vehicle 1 having, generally, a cab side and second or debris collector side. The truck shown is of the type having only a half-cab 2 mounted adjacent the cab side of the truck 1 to enclose the driver because, in the embodiment illustrated, the crew of the truck is comprised only of the driver, who both drives the truck and operates the debris collector. However, it is contemplated that the present invention also is adapted for use with trucks having different cab arrangements and that, for example the cab may extend the full width of the truck (in which case the nozzle and boom assembly would swing in a horizontal arc above the truck cab). It is also contemplated that the present invention is adapted for use with trucks having a station, located adjacent the front of the truck and outside the truck driver's cab, for a second man, who would operate the debris collector while the driver drives the truck; but it is preferred to locate the controls for the nozzle and boom assembly adjacent the driver's station in the cab of the truck, in order that the operator may be protected from the weather and in order that the required crew for the debris collector may be limited to the driver, who may also act as debris collector operator.

The truck 1 has mounted thereon a fully enclosed and self-contained rearwardly tippable tank or body 3, which may be of any suitable type and, as illustrated herein, is of the type and mounted on the truck as described in Patent No. 3,052,908, issued Sept. 11, 1962, to the inventor. A high vacuum is maintained in the tank by a high pressure blower 4, driven by an auxiliary internal combustion engine 5 and ducted to the tank 3. As shown herein, the blower 4, the drive therefor, the auxiliary engine 5 and the rectangular ducts 6 and 7 of the blower 4 and tank 3 are as described in such patent. The rectangular ducts 6 and 7 are registerable with each other and abut tightly against one another when the tank 3 is in the lower or operating position, and thus a vacuum is drawn from the tank 3 by means of the blower 4. The rear end of the tank 3 is comprised of a large dumping door (not shown) as described in such patent, which is hinged at its upper edge to the main part of the tank 3 and which is swingable to an open, debris dumping position as shown in broken lines in FIGURE 1 of such patent.

Although it is contemplated that the invention encompass apparatus in which the nozzle is connected to an opening in the front wall of the vacuum tank 3 by other means, such as the means described in Patent No. 3,052,908, it is preferred that the nozzle be placed in substantially airtight communication with but not connected to such opening, in order to permit the driver to tip the tank 3 rearwardly to discharge debris therefrom through the debris dumping opening without having to leave the cab 2 to disconnect the nozzle. As illustrated, the front wall of the vacuum tank 3 carries a cylindrical duct 8, which is registerable with a cylindrical duct 9 of substantially the same diameter, which is fixedly attached to the frame of the truck 1. One end of a flexible nozzle 10, which is in the form of a corrugated hose, is secured around one end of the latter cylindrical duct 9 by means of a split-ring and bolt assembly 11. The two cylindrical ducts 8 and 9 abut tightly against one another when the tank 3 is in the lower or operating position, forming a substantially airtight seal between the two cylindrical ducts 8 and 9; and when vacuum is drawn from the tank 3 by means of the blower 4, suction is provided at the lower or suction end 12 of the nozzle 10 in the known manner to permit vacuum cleaning of the street or other area.

Nozzle support and direction means

In accordance with the present invention, an improved means has been provided for effortlessly supporting and quickly and precisely directing the lower or suction end 12 of the nozzle 10 forward and to the side of the truck 1, within the vision of the truck driver seated in the truck cab 2. In order to support and direct the suction end 12 to the debris, a turntable or turret 13 is provided, comprised of an upper table-like member connected to depending L-shaped side arms 13a and 13b, which in turn are connected to collar 13c; the turntable 13 is connected to the suction end 12 by a boom assembly comprised of a main boom 14 and second boom 15; and the turntable 13 is rotatable and the main boom 14 and second boom 15 are rotatable or swingable and retractable by power means connected thereto and controllable by control means operated by the truck driver to direct the suction end 12 as described.

Turntable

Support for the turntable 13 is comprised of the frame rails 16 of the truck 1, a transversely extending beam 17 fixedly attached to the frame rails 16 in a position behind the cab 2 and forward of the auxiliary internal combustion engine 5, and a vertical center pin 18, which is fixedly attached to the beam 17 adjacent one end thereof and on the top of which the turntable 13 is rotatably mounted. The turntable thereby is mounted on the truck 1, adjacent the second or debris collector side of the truck 1. When nut 19 is threaded home on center pin 18, the turntable 13 is free to rotate on center pin 18 but is securely connected to beam 17. In order to rotate the turntable 13, power means are provided which, as illustrated in FIGURES 1, 2, and 3, consists of a double-acting hydraulic cylinder unit 20 of the well-known type, comprised of a cylinder 21, a piston and a piston rod 22. The cylinder 21 is pivotally attached at 23 to a housing 24, which covers the auxiliary internal combustion engine 5 and which is fixedly attached to frame rails 16; and the piston rod 22 is pivotally attached at 25 to turntable side-arm 13a. When the piston of cylinder unit 20 is operated, the turntable 13 can be rotated through a horizontal arc, the limits of such rotation being established by the length of piston rod 22.

Main boom

In order to support the nozzle 10 and direct its vertical movement a main boom 14 is pivotally connected to the turntable 13. The main boom 14 is a ladderlike structure comprised of two rectangular side rails 26 and 27, each of which are pivotally connected at one end to the opposite ends of a turntable pin 28, which extends horizontally through the turntable 13. The side rails 26 and 27 are held in spacial relationship to each other by a circular collar 29, which is welded to such side rails 26 and 27 at a point intermediate the ends of such side rails 26 and 27 and which has an inside diameter of substantially the same magnitude as the exterior diameter of the nozzle 10. The nozzle 10 extends through the collar 29 for support. Power means are to vertically swing or rotate the main boom 14 is provided. As illustrated, such power means consists of a double-acting hydraulic cylinder unit 30, similar to cylinder unit 20, acting between the turntable 13 and the main boom 14. The cylinder 31 of cylinder unit 30 is pivotally attached at 32 to the turntable side arms 13a and 13b; and the piston rod 33 of cylinder unit 30 is pivotally attached by means of pin 34, to arms 35, which are welded to a cross brace 36 welded between the rectangular side rails 26 and 27 at a point intermediate collar 29 and turntable pin 28.

Although it is contemplated that the invention encompass a single main boom in which the outer ends of such side rails 26 and 27 would be connected to the suction end 12 of the nozzle 10 to support and direct the suction end 12 to the debris to be collected, it is preferred to add a second boom 15 at the end of the main boom 14, for more precise control of the suction end 12. Accordingly, in the accompanying drawings, the outer ends of the side rails 26 and 27 form a bifurcated end of the main boom 14, in which a second boom 15 is pivotally mounted on pins 37 and 38.

Second boom

The second boom 15 forms an articulated end section on the main boom 14 for operation independently thereof and for supporting and directing the suction end 12 of the nozzle 10. The second boom 15 also is comprised of two rectangular side rails 39 and 40, which are held in spacial relationship by a cross brace 41 welded intermediate the ends thereof and by a collar 42. The collar 42 surrounds and is fixedly attached to the suction end 12 of the nozzle; and, although it is contemplated that the invention encompass a collar fixedly attached to the outer ends of the side rails 39 and 40, it is preferred to provide a pivotal attachment therefor in order that the weight of the suction end 12 and attachments thereto may act to urge the opening of the suction end 12 to remain in parallel relationship to the street surface. Accordingly, as illustrated, the collar 42 is pivotally attached to the outer ends of such side rails 39 and 40, on pins 43 and 44.

The suction end 12 has been shown in FIGURE 1 as being connected to a large cylindrical pipe 45 for insertion in a catch basin 46 or the like. Alternately, various attachments can be secured to the suction end 12 of the nozzle 10 for being moved along the gutter or other portion of the street as the truck 1 proceeds therealong.

Power means are provided for the vertical swinging or rotating of the second boom; and, as illustrated, the power means consists of a double-acting hydraulic cylinder unit 47, similar to cylinder units 20 and 30, and acting between the main boom 14 and the second boom 15. The cylinder 48 of cylinder unit 47 is pivotally attached by means of pin 49 to arms 50 welded to the collar 29 of the main boom 14; and the piston rod 51 thereof is pivotally attached by means of pin 52 to arms 53, which are welded to the cross brace 41 of the second boom 15.

Power means

Although the power means illustrated in FIGURES 1, 2 and 3 are double-acting hydraulic cylinder units 20, 30 and 47 of the well-known type, it is contemplated that the present invention is adapted for use with other power means such as, for example, single-acting hydraulic cylinders, hydraulic motors or electric motors, and that several different types of power means may be employed in an embodiment of such invention. For example, FIGURE 4 illustrates the use of a hydraulic motor 54, mounted on the center-pin 18, to rotate the turntable 13, by means of a drive gear 55 engaged with a ring gear 56, mounted on turntable collar 13c. The hydraulic circuitry for providing hydraulic fluid to such hydraulic motor 54 is identical the circuitry shown in FIGURES 1, 2 and 3 for providing hydraulic fluid to double-acting cylinder unit 20.

Control means

In the embodiment of the invention illustrated in FIGURES 1 and 2, the operation of the turntable 13, the main boom 14 and the second boom 15 and, therefore, the direction and positioning of the suction end 12 of the flexible nozzle 10 are controlled by operation of a hydraulic valve console 57, which is mounted in the truck cab 2 adjacent the driver's seat. The valve console 57 is of conventional design incorporating hydraulic flow dividers, and includes a plurality of manually-operable valve-actuating handles 58. Pairs of flexible conduits 59, 60 and 61 connect the cylinder units 20, 30 and 47, respectively, with the console 57; and the respective handles 58 control the flow of hydraulic fluid through such conduits 59, 60 and 61, whereby the piston rods 22, 33 and 51 of the respective cylinder units 20, 30 and 47 are extended or retracted. The hydraulic fluid which is supplied to the flow dividers of the valve console 57 is pumped thereto by a hydraulic pump 62, having sufficient pumping capacity to simultaneously provide hydraulic fluid to all of the cylinder units 20, 30 and 47 and simultaneously extend or retract their respective piston rods 22, 33 and 51, as desired by the operator of the valve console 57; and the pressure of the fluid delivered to such flow dividers of the console 57 is controlled by a manually-adjustable flow regulating valve 63 in the high-pressure hydraulic conduit 64 between the pump 62 and the console 57. The hydraulic fluid circuits and the valving therefor have not been set forth in the drawings since the circuits and valves are old and well-known in the art. Briefly, as the truck driver pulls a selected one of the valve handles 58 in one direction, hydraulic fluid passes from the console 57 through one conduit of one of the pairs 59, 60 and 61 to the cylinder side of the cylinder unit which is associated with such valve handle, while at the same time hydraulic fluid on the piston rod side of such cylinder unit is being returned to the console 57 through the other conduit of such pair. Fluid flow through the selected pair of conduits may be reversed by pushing the selected valve handle 58 in the opposite direction, and the flow of fluid in either direction is halted by moving the selected valve handle to a neutral or central position. If a hydraulic motor 54 is used as one of the power means, as shown in FIGURE 4, pulling a selected one of the valve handles in one direction will permit hydraulic fluid to flow to the hydraulic motor 54 through one conduit of a pair 59 to the motor 54, causing it to rotate in a clockwise direction, and such hydraulic fluid is returned to the console 57 through the other conduit of the pair 59. Pushing the selected valve handle in the opposite direction will reverse the flow through the conduits of the pair 59 and, therefore, the direction of rotation of the hydraulic motor 54.

By virtue of the pumping capacity of the pump 62, and the incorporation of the flow dividers in the valve console 57, the truck driver may operate two or more of the valve handles 58 simultaneously and thereby, for example, cause the piston rod 22 of cylinder unit 20 to extend and, at the same time, cause the piston rod 33 of cylinder unit 30 to retract.

Operation of apparatus

Although it is believed that the above description and illustration of the invention in detail may make the operation of the apparatus self-evident, the following is a brief summary of the operation of the apparatus shown in FIGURES 1, 2 and 3.

The truck 1 is driven to the location of the debris, with the nozzle 10 in retracted or highway position. Upon arrival at such location, the driver either may stop the truck 1 and proceed with operation of the apparatus, or he may continue driving the truck 1 and, at the same time, operate the apparatus to collect the debris. In either case, and assuming that the debris is located in a street gutter in front of and to the right of the center line of the truck 1, the driver moves the valve handles 58 which control the flow of hydraulic fluid to, respectively, cylinder units 30 and 47 in directions which will permit hydraulic fluid to flow to the piston rod side or cylinder side, as the case may be, of such cylinders units, respectively, so as to cause the piston rods 33 and 51 of such cylinder units respectively to extend or retract and thereby raise or lower the main boom 14 and the second boom 15, respectively, to bring the suction end 12 of the nozzle 10 to an operating position above the pavement and slightly higher than the height of the debris. The driver then returns each of such valve handles 58 to neutral or central position and moves the valve handle 58 which controls the flow of hydraulic fluid to cylinder unit 20 in a direction which will permit hydraulic fluid to flow to the cylinder side of such cylinder unit 20, thereby causing the piston rod 22 of such cylinder unit 20 to extend, rotating the turntable 13 in a clockwise direction to swing the suction end 12 of the nozzle 10 in a horizontal arc to a position immediately above the debris. The driver then returns such valve handle 58 to neutral or central position, and starts the auxiliary internal combustion engine 5, which in turn, drives the blower 4 and causes a vacuum to be drawn from the vacuum tank 3 and a suction to be provided at the suction end 12 of the nozzle 10. If the debris in the gutter extends for some distance along the gutter, the driver then may drive the truck 1 in a direction parallel to the gutter; and the previously established position of the suction end 12 of the nozzle 10, immediately above the debris, will enable the driver to pick up the debris without further manipulation of the valve handles 58. When the debris has been completely sucked into the vacuum tank 3, the driver, by manipulation of the several valve handles 58, may cause the turntable 13 to rotate in counterclockwise direction to its original position and may cause the main boom 14 and second boom 15 to retract the nozzle 10 to a position satisfactory for driving the truck 1 at highway speeds. If the driver determines to discharge the debris from the vacuum tank 3, the driver can drive the truck 1 to the site selected for discharging the debris from the tank 3; and, upon reaching such site, he can cause the vacuum tank 3 to be tipped rearwardly to discharge the debris in the tank 3 through the debris dumping opening in the well-known manner.

Thus, the apparatus has the advantages of permitting the driver to retract the nozzle 10 to a position such that he has an unobstructed view of the highway ahead of the truck 1 while driving to and from the site of the debris to be collected; and of obviating any concern on the part of the driver that, when in retracted position, the nozzle 10 or the main boom 14 or the second boom 15 will cause the overall height of the truck 1 and tank 3 to exceed the height limitations of highway underpasses or low-hanging tree limbs or the like. Upon arrival at the site of the debris and, if desired, while the truck is in motion, the driver, by manipulation of the valve handles 58, selectively and independently can control the extension and retraction of the several piston rods 22, 33 and 51 and thereby rotate the turntable 13 and raise and lower the main boom 14 and the second boom 15 so as to precisely, effortlessly and rapidly direct the suction end 12 of the nozzle 10 to the debris, all while remaining within the cab 2 of the truck 1, protected from the weather, and while having the suction end 12 of the nozzle 10 within his vision. Finally, when the collection of debris has been completed and the driver, by manipulating the valve handles 58, has retracted the nozzle 10 to highway position, the truck can be driven at highway speeds to the debris dumping site where the tank 3 can be tipped rearwardly to dump the debris. Because the nozzle 10 is not connected to the tank 3 but, rather, is in substantially airtight communication therewith by virtue of abutting cylindrical ducts 8 and 9 when the tank is in lower or operating position, the driver does not have to leave the cab 2 to disconnect the nozzle 10 from the tank 3.

Various modes for carrying out the invention are contemplated as being within the scope of the following claims particularly pointing out and distinctly claiming the subject matter which is regarded as the invention.

I claim:
1. In a vacuum debris collector, for a vehicle movable to the site of the debris to be collected and having an enclosed vacuum tank with a forward intake opening,
    a flexible pick-up nozzle having a suction end and a second end with said second end in substantially airtight communication with said opening,
    a power boom assembly rotatably mounted on said vehicle adjacent said tank and connected to said nozzle,
    power means for rotating and retracting said power boom assembly, and
    control means remote from said power boom assembly and said power means and connected to said power means, whereby said power boom assembly can be controllably rotated to direct said suction end selectively forward and to the side of said vehicle to said debris and said power boom assembly and said nozzle can be controllably retracted to a position in which said power boom assembly and said nozzle do not substantially add to the overall height of said vehicle.

2. In a vacuum debris collector, for a vehicle movable to the site of the debris to be collected and having an enclosed vacuum tank with a forward intake opening,
    a flexible pick-up nozzle having a suction end and a second end with said second end in substantially airtight communication with said opening,
    turntable means rotatably mounted on said vehicle in a position adjacent said tank and below the overall height of said vehicle and rotatable about an axis,
    a boom connected to said nozzle and pivotally mounted on said turntable and swingable in a plane generally parallel to said axis,
    power means for rotating said turntable and swinging and retracting said boom, and
    control means remote from said turntable means, said boom and said power means and connected to said power means for selectively and independently controlling said power means, whereby said turntable means can be controllably rotated and said boom can be controllably swung to direct said suction end forward and to the side of said vehicle to said debris and said boom and said nozzle can be controllably retracted to a position in which said boom and said nozzle do not substantially add to the overall height of said vehicle.

3. In a vacuum debris collector, for a vehicle movable to the site of the debris to be collected and having an enclosed vacuum tank with a front intake opening,
    a flexible pick-up nozzle having a suction end and a second end with said second end in substantially airtight communication with said opening,
    a turntable rotatably mounted on said vehicle in a position adjacent said tank and below the overall height of said vehicle and rotatable about an axis,
    a main boom pivotally mounted on said turntable and swingable in a plane generally parallel to said axis,
    a second boom articulated on said main boom and connected to said nozzle,
    power means for rotating said turntable and swinging and retracting said main boom, and
    control means remote from said turntable, said main boom and said power means and connected to said power means for selectively and independently controlling said power means, whereby said turntable can be controllably rotated and said main boom can be controllably swung to direct said suction end forward and to the side of said vehicle to said debris and said main boom, said second boom and said nozzle can be controllably retracted to a position in which said main boom, said second boom and said nozzle do not substantially add to the overall height of said vehicle.

4. In a vacuum debris collector, for a vehicle movable to the site of the debris to be collected and having an enclosed vacuum tank with a front intake opening,
    a flexible pick-up nozzle having a suction end and a second end with said second end in substantially airtight communication with said opening,
    a turntable rotatably mounted on said vehicle in a position adjacent said tank and below the overall height of said vehicle and rotatable about an axis,
    first power means for rotating said turntable,
    a main boom pivotally mounted on said turntable and swingable in a plane generally parallel to said axis,
    second power means for swinging and retracting said main boom,
    a second boom articulated on said main boom and connected to said nozzle, and
    control means remote from said turntable, said main boom and said first and second power means and respectively connected to said first and second power means for selectively and independently controlling said power means, whereby said turntable can be controllably rotated and said main boom and second boom can be controllably swung to direct said suction end selectively forward and to the side of said vehicle to said debris and said main boom, said second boom and said nozzle can be controllably retracted to a position in which said main boom, said second boom and said nozzle do not substantially add to the overall height of said vehicle.

5. In a vacuum debris collector, for a vehicle movable to the site of the debris to be collected and having an enclosed vacuum tank with a front intake opening,
    a flexible pick-up nozzle having a suction end and a second end with said second end in substantially airtight communication with said opening, a turntable rotatably mounted on said vehicle in a position adjacent said tank and below the overall height of said vehicle and rotatable about an axis, first power means between said vehicle and said turntable for rotating said turntable, a main boom pivotally mounted on said turntable and swingable in a plane generally parallel to said axis, second power means between said turntable and said main boom for swinging and retracting said main boom, a second boom articulated on said main boom and connected to said nozzle, and first and second control means remote from said turntable, said main boom, and said first and second power means and respectively connected to said first and second power means for selectively and independently controlling said power means, whereby said turntable can be controllably rotated and said main boom and second boom can be controllably swung to direct said suction end selectively forward and to the side of said vehicle to said debris and said main boom, said second boom and said nozzle can be controllably retracted to a position in which said main boom, said second boom and said nozzle do not substantially add to the overall height of said vehicle.

6. In a vacuum debris collector, for a vehicle movable to the site of the debris to be collected and having an enclosed vacuum tank with a front intake opening, a flexible pick-up nozzle having a suction end and a second end with said second end in substantially airtight communication with said opening, a turntable rotatably mounted on said vehicle in a position adjacent said tank and below the overall height of said vehicle and rotatable about an axis, a main boom pivotally mounted on said turntable and swingable in a plane generally parallel to said axis, a vertically articulatable second boom on said first boom and connected to said nozzle, power means for rotating said turntable, swinging and retracting said main boom and articulating and retracting said second boom, and control means remote from said turntable, said main boom, said second boom and said power means and connected to said power means for selectively and independently controlling said power means, whereby said turntable can be controllably rotated and said main boom and second boom respectively can be controllably swung and articulated to direct said suction end selectively forward and to the side of said vehicle to said debris and said main boom, said second boom and said nozzle can be controllably retracted to a position in which said main boom, said second boom and said nozzle do not substantially add to the overall height to said vehicle.

7. A vacuum debris collector, for a vehicle movable to the site of the debris to be collected and having an enclosed vacuum tank with a front intake opening, comprising a flexible pick-up nozzle having a suction end and a second end with said second end in substantially airtight communication with said opening, a turntable rotatably mounted on said vehicle in a position adjacent said tank and below the overall height of said vehicle and rotatable about an axis, first power means for rotating said turntable, a main boom pivotally mounted on said turntable and swingable in a plane generally parallel to said axis, second power means for swinging and retracting said main boom, a vertically articulatable second boom on said main boom and connected to said nozzle, third power means for articulating and retracting said second boom, and first, second and third control means remote from said turntable, said main and second booms and said first, second and third power means and respectively connected to said first, second and third power means for selectively and independently controlling said power means, whereby said turntable can be controllably rotated and said main boom and second boom respectively can be controllably swung and articulated to direct said suction end selectively forward and to the side of said vehicle to said debris and said main boom, said second boom and said nozzle can be controllably retracted to a position in which said main boom, said second boom and said nozzle do not substantially add to the overall height of said vehicle.

8. A vacuum debris collector, for a vehicle movable to the site of the debris to be collected and having an enclosed vacuum tank with a front intake opening, comprising a flexible pick-up nozzle having a suction end and a second end with said second end in substantially airtight communication with said opening, a turntable rotatably mounted on said vehicle in a position adjacent said tank and below the overall height of said vehicle and rotatable about an axis, first power means between said vehicle and said turntable for rotating said turntable, a main boom pivotally mounted on said turntable and swingable in a plane generally parallel to said axis, second power means between said turntable and said main boom for swinging and retracting said main boom, a vertically articulatable second boom on said main boom and connected to said nozzle, third power means between said main boom and said second boom for articulating and retracting said second boom, and first, second and third control means remote from said turntable, said main and second booms and said first, second and third power means and respectively connected to said first, second and third power means for selectively and independently controlling said power means, whereby said turntable can be controllably rotated and said main boom and second boom respectively can be controllably swung and articulated to direct said suction end selectively forward and to the side of said vehicle to said debris and said main boom, said second boom and said nozzle can be controllably retracted to a position in which said main boom, said second boom and said nozzle do not substantially add to the overall height of said vehicle.

9. A vacuum debris collector, for a vehicle movable to the site of the debris to be collected and having an enclosed vacuum tank with a front intake opening, comprising a flexible pick-up nozzle having a suction end and a second end with said second end in substantially airtight communication with said opening, a turntable rotatably mounted on said vehicle in a position forward of said tank and below the overall height of said vehicle and rotatable about a vertical axis, first power means between said vehicle and said turntable for rotating said turntable, a main boom pivotally mounted on said turntable and swingable in a generally vertical plane, second power means between said turntable and said main boom for swinging and retracting said main boom, a second boom pivotally connected to said main boom and swingable in a generally vertical plane and connected to said nozzle, third power means between said main boom and said second boom for swinging and retracting said second boom, and first, second and third control means remote from said turntable, said main and second booms and said first, second and third power means and respectively connected to said first, second and third power means for selectively and independently controlling said power means, whereby said turntable can be controllably rotated and said main boom and second boom respectively can be controllably swung to direct said suction end selectively forward and to the side of said vehicle to said debris and said main boom, said second boom and said nozzle can be controllably retracted to a position in which said main boom, said second boom and said nozzle do not substantially add to the overall height of said vehicle.

10. The apparatus of claim 9, with said vehicle having a cab side and a second side and a half-cab mounted thereon forward of said tank and adjacent said cab side of said vehicle, and with said turntable mounted adjacent said second side of said vehicle, whereby said position to which said main boom, said second boom and said nozzle can be controllably retracted is substantially between said half-cab and the vertical plane of said second side.

11. The apparatus of claim 9, with said vehicle having an operator's station mounted thereon adjacent the front end thereof, and with said first, second and third control means mounted adjacent said operator's station.

12. The apparatus of claim 11, with said vehicle having a cab, and with said operator's station in said cab.

13. The apparatus of claim 9, with said vehicle having a cab and a driver's station in said cab, and with said first, second and third control means mounted adjacent said driver's station.

14. A vacuum debris collector as described in claim 13 in which said first, second and third control means are mounted in said cab.

15. The apparatus of claim 14, in which said vacuum tank is rearwardly tippable and has a rearward debris dumping opening, and fourth power means for rearwardly tipping said tank, and fourth control means mounted in said cab and remote from said fourth power means for controlling said fourth power means, whereby said tank can be controllably tipped to dump debris from said tank through said debris dumping opening.

16. A vacuum debris collector as described in claim 9 in which said second boom is connected to said suction end.

17. A vacuum debris collector as described in claim 16 in which said second boom is pivotally connected to said suction end.

18. A vacuum debris collector as described in claim 16 in which at least one of said first, second and third control means is a manually-operable hydraulic valve.

19. A vacuum debris collector as described in claim 16 in which at least one of said first, second and third power means is a double-acting hydraulic cylinder unit.

20. A vacuum debris collector as described in claim 16 in which at least one of said first, second and third power means is a hydraulic motor.

References Cited

UNITED STATES PATENTS

| 2,803,847 | 8/1957 | Hobbs | 15—340 X |
| 2,830,510 | 4/1958 | Mariani et al. | 15—340 X |
| 3,010,590 | 11/1961 | Troth | 214—77 X |
| 3,150,404 | 9/1964 | Johnson | 15—340 X |

FOREIGN PATENTS

| 623,871 | 1/1936 | Germany. |

ROBERT W. MICHELL, *Primary Examiner.*